(12) United States Patent
Giegel

(10) Patent No.: US 10,831,215 B2
(45) Date of Patent: Nov. 10, 2020

(54) APPARATUS AND METHOD FOR THE AUTONOMOUS TRANSPORTATION OF GOODS AND/OR PEOPLE

(71) Applicant: Hyperloop Technologies, Inc., Los Angeles, CA (US)

(72) Inventor: Joshua Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 115 days.

(21) Appl. No.: 15/670,771

(22) Filed: Aug. 7, 2017

(65) Prior Publication Data

US 2018/0039285 A1    Feb. 8, 2018

Related U.S. Application Data

(60) Provisional application No. 62/371,540, filed on Aug. 5, 2016.

(51) Int. Cl.
| | |
|---|---|
| *G05D 1/02* | (2020.01) |
| *B60M 1/30* | (2006.01) |
| *B60L 13/04* | (2006.01) |
| *B60L 15/38* | (2006.01) |
| *B60M 7/00* | (2006.01) |

(Continued)

(52) U.S. Cl.
CPC ............ *G05D 1/0293* (2013.01); *B60L 13/04* (2013.01); *B60L 15/38* (2013.01); *B60M 1/30* (2013.01); *B60M 7/003* (2013.01); *B60P 3/42* (2013.01); *B61B 13/00* (2013.01); *B61L 27/0077* (2013.01); *B61L 27/04* (2013.01); *B65B 17/02* (2013.01); *B65D 69/00* (2013.01); *G05D 1/0088* (2013.01); *B60L 5/38* (2013.01); *G05D 2201/0212* (2013.01);

(Continued)

(58) Field of Classification Search
CPC .............. G05D 1/0293; G05D 1/0088; G05D 2201/0212; G05D 2201/0213; G05D 2201/0216; B60L 13/04; B60L 15/38; B60L 5/38; B60L 13/00; B60M 1/30; B60M 7/003; B60P 3/42; B61B 13/00; B61L 27/0077; B61L 27/04; B65B 17/02; B65D 69/00; G06Q 10/087; Y02T 30/30; G08G 1/22
USPC ......................................................... 701/19
See application file for complete search history.

(56) References Cited

U.S. PATENT DOCUMENTS 9,084,941 B1 *  7/2015  Fram ...................... A63G 31/16
9,718,630 B2    8/2017  Bambrogan et al.
(Continued)

OTHER PUBLICATIONS

Notification of Transmittal of Int'l Search Report and Written Opinion of the Int'l Searching Auth., or the Declaration (Form PCT/ISA/220) issued in counterpart Int'l Appln. No. PCT/US17/45757 (dated Dec. 20, 2017).

(Continued)

*Primary Examiner* — Paula L Schneider
(74) *Attorney, Agent, or Firm* — Greenblum & Bernstein, P.L.C.

(57) ABSTRACT

Method and system for autonomously transporting people and/or goods. The method includes requesting conveyance of a payload from a designated area to a destination, autonomously moving at least one module to the designated area, loading the at least one module with a payload within the designated area, and, via the at least one module, autonomously transporting the payload to the destination.

20 Claims, 19 Drawing Sheets

(51) Int. Cl.
    *B60P 3/42*         (2006.01)
    *B61B 13/00*       (2006.01)
    *B61L 27/00*       (2006.01)
    *B61L 27/04*       (2006.01)
    *B65B 17/02*       (2006.01)
    *B65D 69/00*       (2006.01)
    *G05D 1/00*        (2006.01)
    *B60L 5/38*        (2006.01)
    *G06Q 10/08*      (2012.01)

(52) U.S. Cl.
    CPC .............. *G05D 2201/0213* (2013.01); *G05D 2201/0216* (2013.01); *G06Q 10/087* (2013.01); *Y02T 30/30* (2013.01)

(56) References Cited

U.S. PATENT DOCUMENTS

| | | | | |
|---|---|---|---|---|
| 2006/0095169 | A1* | 5/2006 | Minor | G05D 1/0293 701/23 |
| 2012/0195724 | A1* | 8/2012 | Toebes | B65G 13/00 414/509 |
| 2013/0125778 | A1* | 5/2013 | LaCabe | B61B 13/00 104/130.01 |
| 2014/0136414 | A1* | 5/2014 | Abhyanker | G06Q 50/28 705/44 |
| 2014/0374532 | A1* | 12/2014 | Duffy | B64C 37/02 244/2 |
| 2015/0006005 | A1* | 1/2015 | Yu | G06Q 10/08 701/22 |
| 2016/0229418 | A1 | 8/2016 | Bambrogan et al. | |
| 2016/0359330 | A1* | 12/2016 | Jin | H02J 50/50 |
| 2018/0022405 | A1* | 1/2018 | Gecchelin | B60D 1/36 701/23 |
| 2018/0130017 | A1* | 5/2018 | Gupte | G06Q 10/0836 |
| 2018/0186450 | A1* | 7/2018 | Chang | B64C 27/10 |

OTHER PUBLICATIONS

Int'l Search Report (Form PCT/ISA/210) issued in counterpart Int'l Appln. No. PCT/US17/45757 (dated Dec. 20, 2017).
Written Opinion of the Int'l Searching Auth. (Form PCT/ISA/237) issued in counterpart Int'l Appln. No. PCT/US17/45757 (dated Dec. 20, 2017).

* cited by examiner

APPARATUS AND METHOD FOR THE AUTONOMOUS TRANSPORTATION OF GOODS AND/OR PEOPLE

CROSS-REFERENCE TO RELATED APPLICATION

This application claims the benefit under 35 U.S.C. § 119(e) of U.S. Provisional Application No. 62/371,540 filed Aug. 5, 2016, the disclosure of which is expressly incorporated by reference herein in its entirety.

BACKGROUND OF THE DISCLOSURE

1. Field of the Disclosure

Embodiments are directed to a system for assembling apparatuses for transporting people and/or goods.

2. Discussion of Background Information

Many companies have made great strides in the development of modern autonomous vehicles: by 2011 Google had racked up over 140,000 miles in its driverless car; in 2014 Tesla released an autopilot system for its electric vehicles; and in 2016 Uber begun testing a driverless car to be used in conjunction with its on-demand, ride-share model. Although these innovative steps have solved many issues inherent to the autonomous vehicle problem, many problems are left to be solved, such as interactions with other autonomous vehicles.

Further, these innovations have yet to explore the transportation of goods, an industry that spends more than $1.5 trillion a year. Many costs that the transportation industry is subject to are related to inefficiencies in the current technology. For example, trucks used in the last stage of shipping are slow, cumbersome, and inefficient gas guzzlers. A solution to these problems should be efficient, autonomous, and on-demand.

SUMMARY OF THE EMBODIMENTS OF THE DISCLOSURE

Embodiments are directed to an autonomous, on-demand system for transporting people and/or goods via a plurality of autonomous, modifiable apparatuses. The system comprises a plurality of autonomous apparatuses that can be combined to adapt to a multitude of transportation needs and to offer solutions to inventory management problems.

Embodiments are directed to an autonomous, on-demand system for transporting people and/or goods via a plurality of autonomous, modifiable apparatuses. The system comprises a plurality of modules that can be combined to assemble a multitude of autonomous apparatuses configured to provide transportation needs for people and/or goods and to offer solutions to inventory management problems.

The novel features which are characteristic of the disclosure, both as to structure and method of operation thereof, together with further aims and advantages thereof, will be understood from the following description, considered in connection with the accompanying drawings, in which the preferred embodiment of the disclosure is illustrated by way of example. It is to be expressly understood, however, that the drawings are for the purpose of illustration and description only, and they are not intended as a definition of the limits of the disclosure.

Embodiments of the invention are directed to a method for autonomously transporting people and/or goods. The method includes requesting conveyance of a payload from a designated area to a destination; autonomously moving at least one module to the designated area; and loading the at least one module with a payload within the designated area. The method also includes, via the at least one module, autonomously transporting the payload to the destination.

According to embodiments, based upon a size and shape of the payload to be conveyed, a specific number of the at least one modules for supporting and autonomously transporting the payload can be determined.

In accordance with further embodiments, the method can include instructing specific ones of the at least one module to autonomously move to the designated area. When the specific ones of the at least one module is greater than one, the instructed specific ones of the at least one module may position themselves relative to each other to receive and balance the payload.

In embodiments, the payload loaded at least one module can travels in a convoy that can include a plurality of other payload loaded modules. The payload loaded at least one module autonomously may move from the designated area and autonomously joins the convoy. The method can also include magnetically connecting the payload loaded at least one module to an other payload loaded module of the convoy, wherein the convoy moves to the destination. When the convoy reaches the destination, the payload loaded at least one module can be decoupled from the convey and autonomously moves to a designated unloading zone.

According to other embodiments, when the destination is reached, the payload loaded at least one module may autonomously move to a designated unloading zone. The method can also include unloading the payload from the at least one module and autonomously moving the at least one module to a second designated area. In the second designated area, the at least one module can await further instructions.

In accordance with other embodiments, the payload can include one of a container, a train car, a pod or a flatbed carrier According to still other embodiments, the at least one module may include at least two wheels and a chassis arranged between the wheels.

In still other embodiments, the at least one module can include a magnetic levitation module.

In other embodiments, the at least one module may include a battery and the method can further include charging the battery while the at least one module is autonomously transporting the payload to the destination.

Embodiments of the invention are directed to a system for autonomously transporting people and/or goods. The system includes a payload structured for carrying people and/or goods; and at least one module, which is configured for autonomous movement and structured to support the payload. The payload is removably connectable to the at least one module.

In embodiments, the at least one module can include two wheels and a chassis arranged between the two wheels.

According to other embodiments, the at least one module may include a steering system for guiding the autonomously moving at least one module.

According to embodiments, the at least one module can include a rechargeable battery and a connection for charging the battery while the at least one module is autonomously moving.

In accordance with still yet other embodiments of the present invention, the at least one module may include at least one magnetic coupling structured and arranged to releasably couple the at least one module to another at least one module.

BRIEF DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION OF THE EMBODIMENTS OF THE DISCLOSURE

Figure 1:
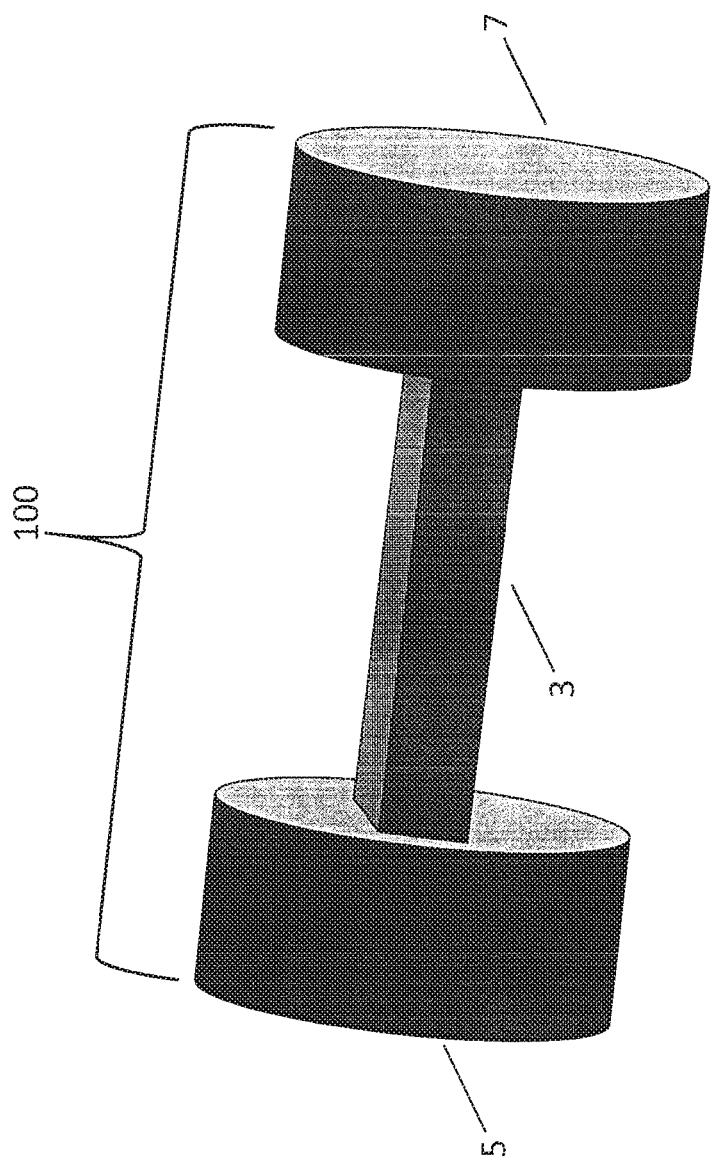
FIG. 1 shows a first exemplary autonomous transportation apparatus in accordance with aspects of the disclosure.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt may be made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, as used herein, the indefinite article "a" indicates one as well as more than one and does not necessarily limit its referent noun to the singular. Thus, for example, reference to "a magnetic material" would also indicate that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B."

The various embodiments disclosed herein can be used separately and in various combinations unless specifically stated to the contrary.

Embodiments of the present disclosure may be used in a transportation system, for example, as described in commonly-assigned application Ser. No. 15/007,783, entitled "Transportation System," the contents of which are hereby expressly incorporated by reference herein in their entirety.

FIG. 1 shows a first exemplary module 100 for providing and/or producing the autonomous transport of people and/or goods. The first module includes a chassis 3 and plurality of wheels, e.g., a first wheel 5 and a second wheel 7. Depending on design decisions, the first and second wheels 5, 7 may, but do not necessarily, rotate independently of each other. Moreover, it is understood that, in addition to, or alternatively to, first and second wheels 5, 7, module 100 can include an array of magnets arranged to face a track (not shown) over which module 100 is to traverse in order to operate as part of a magnetic levitation (maglev) system.

First and second wheels 5, 7 may include a first plurality of instruments, e.g., a speed sensor, a tire pressure gauge, a temperature gauge, and/or a load cell. Additionally, chassis 3 may also include a second plurality of instruments, e.g., at least one camera, at least one proximity sensor, a radar sensor, range detection, mapping sensors and/or a LIDAR sensor. In addition to the second plurality instruments, chassis 3 may include, e.g., a control panel to allow input and output of commands and data and a secure wireless communication system configured to transmit and receive commands and data to/from a central controller and/or other modules.

In accordance with aspects of the disclosure, a plurality of packages may be attached to the module 100 to improve it and adapt to changing needs.

Figure 19:
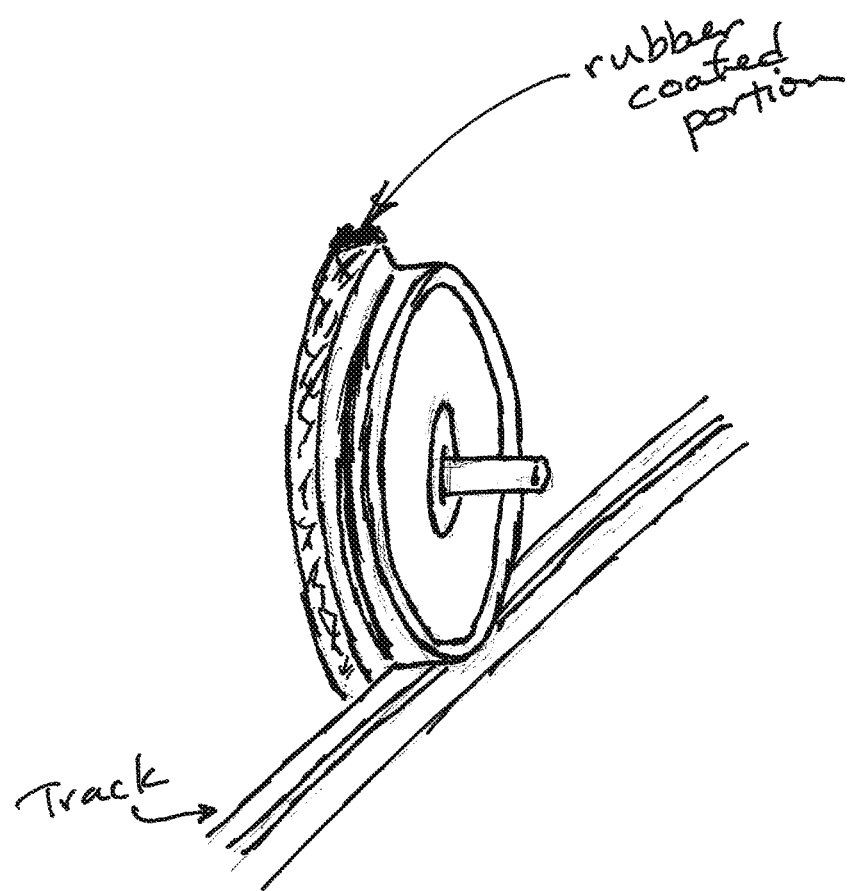
FIG. 19 is an alternate embodiment of a wheel in accordance with embodiments.

In embodiments, the wheels may be rubber for normal roads or steel similar to train wheels (e.g., for operation on a track). In other embodiments, the wheels can be rubber with an outer steel band for operation on a track, see FIG. 19.

The chassis 3 of module 100 may include a platform for supporting a payload (not shown in FIG. 1), which can be configured for transporting people and/or goods. The platform can be an electromagnetic retention system, a mechanical latching system, or a combination of the two.

In an alternate embodiment, a module can be formed by a single wheel, either with or without an axle. In embodiments in which the single wheel does not include an axle, the single wheel should be dimensioned to provide sufficient space to include a battery and other equipment within the single wheel. Moreover, in embodiments in which the single wheel includes an axle, the axle can be a short axle, which extends axially outwardly from the wheel hub. In such embodiments, the axle advantageously is balanced so that the wheel can be maintained in an upright, rolling position. In other embodiments, the single wheel can be connected to another single wheel, e.g., via an axle or via a chassis. With a chassis, the chassis can include an extending axle to connect the single wheel without an axle or can include a receptacle for receiving an end of the short axle of the single wheel with axle. Further, the chassis can include receptacles for receiving both ends of the short axle of the single wheel with axle, e.g., located in a middle portion of the chassis.

Figure 2:
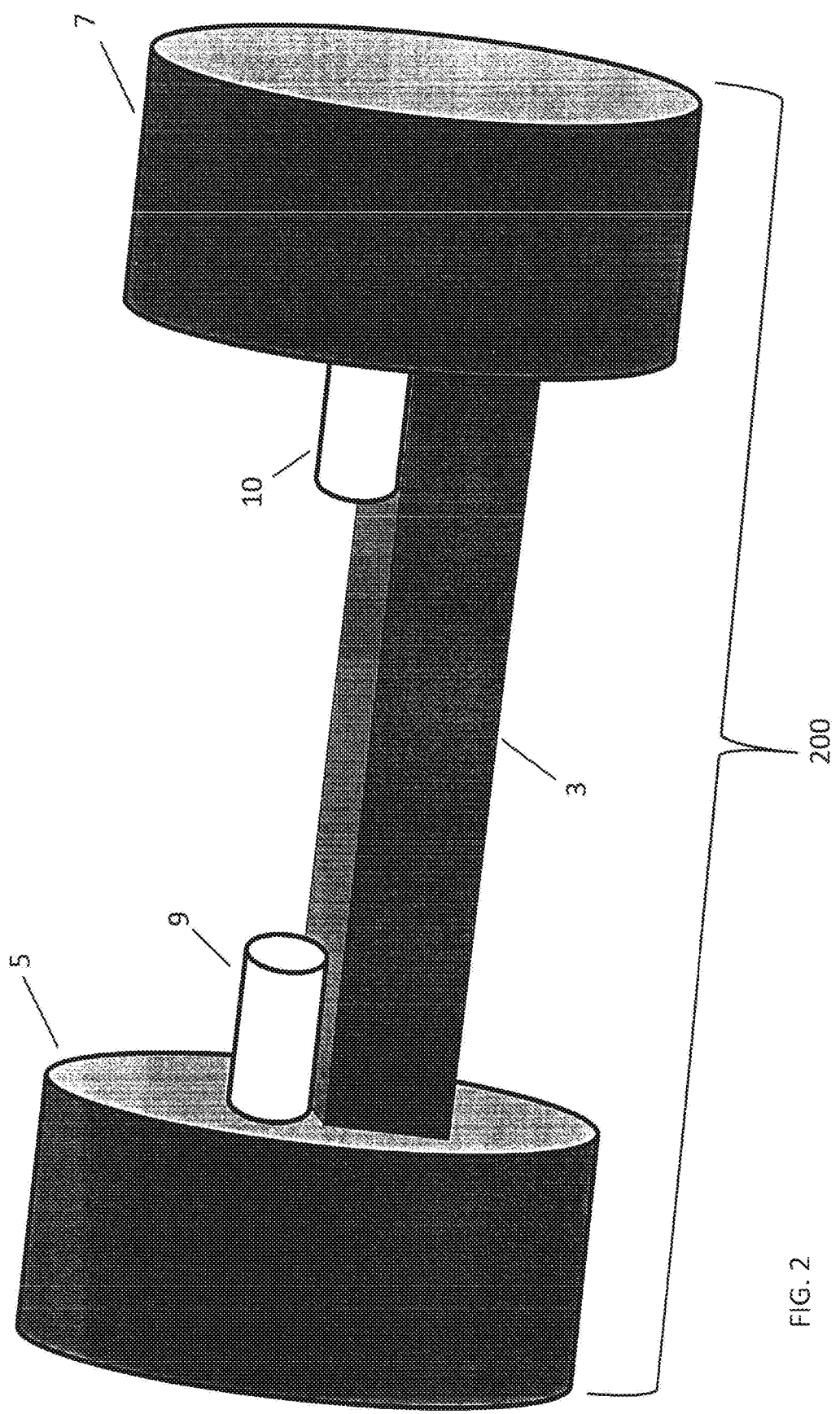
FIG. 2 shows an apparatus in a first motor configuration in accordance with aspects of the disclosure.

FIG. 2 shows a module 200 having a first motor configuration. In the first motor configuration, a first chassis mounted electric motor (FCMEM) 9 and a second chassis mounted electric motor (SCMEM) 10 are structured and arranged to attach to chassis 3 of module 200. FCMEM 9 is further attached to drive first wheel 5, and SCMEM is further attached to drive the second wheel 7. FCMEM 9 and SCMEM 10, which can be coupled to the control panel, as well as to the first and second plurality of instruments can be driven and controlled independently from each other.

Figure 3:
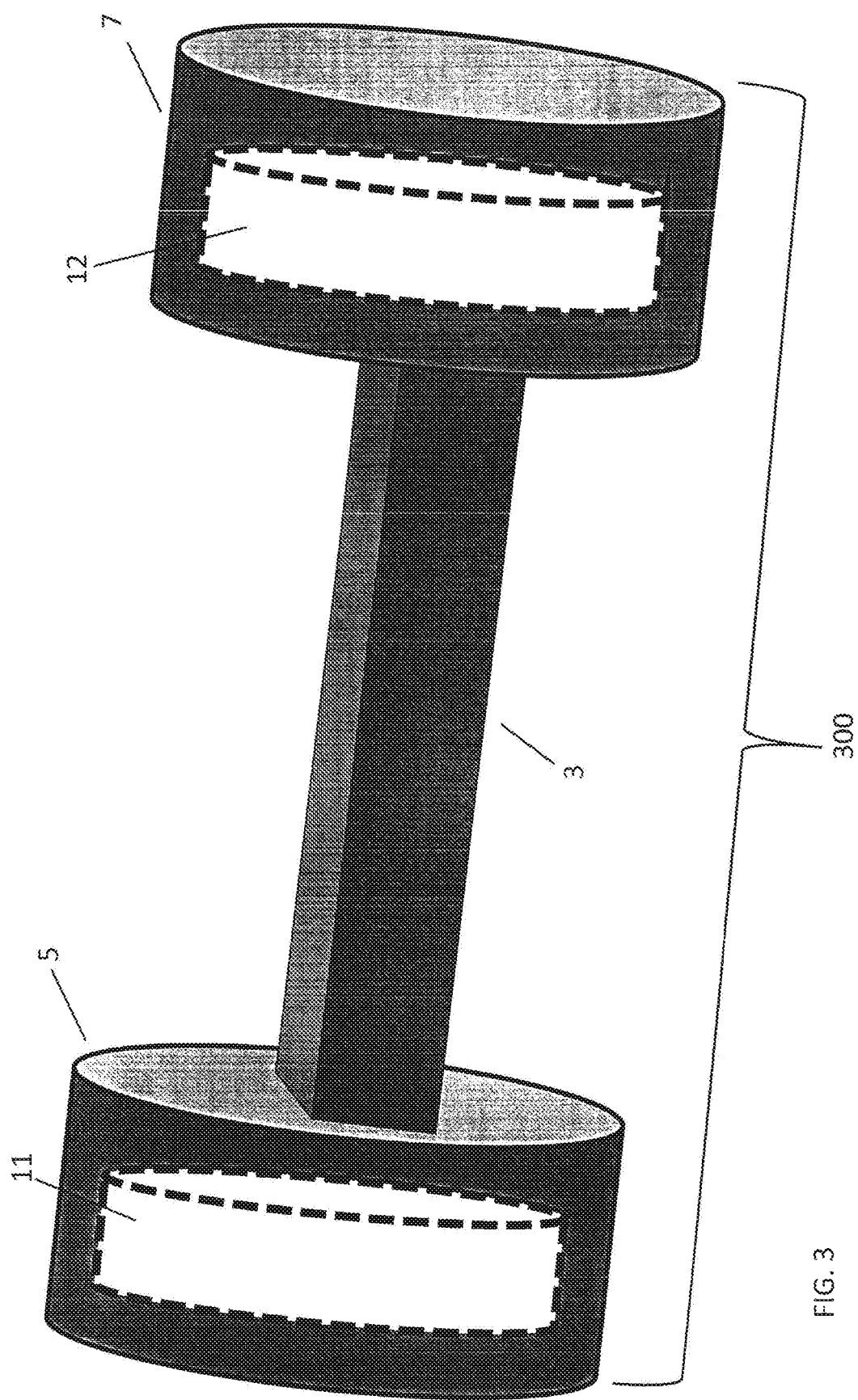
FIG. 3 shows an apparatus in a second motor configuration in accordance with aspects of the disclosure.

FIG. 3 shows a module 300 having a second motor configuration. In the second motor configuration, first wheel 5 includes a first wheel mounted electric motor (FWMEM) 11 and second wheel 7 includes a second wheel mounted electric motor (SWMEM) 12. That is, in this exemplary embodiment, motors 11 and 12 are respectively mounted within respective wheels of module 100. FWMEM 11 is configured to drive first wheel 5 and SWMEM 12 is configured to drive second wheel 7. Moreover, FWMEM 11 and TWMEM 12, which can be coupled to the control panel, as well as to the first and second plurality of instruments can be driven and controlled independently from each other. In embodiments, wheels 5 and 7 can be freely rotatable around a hub (not shown).

Figure 4:
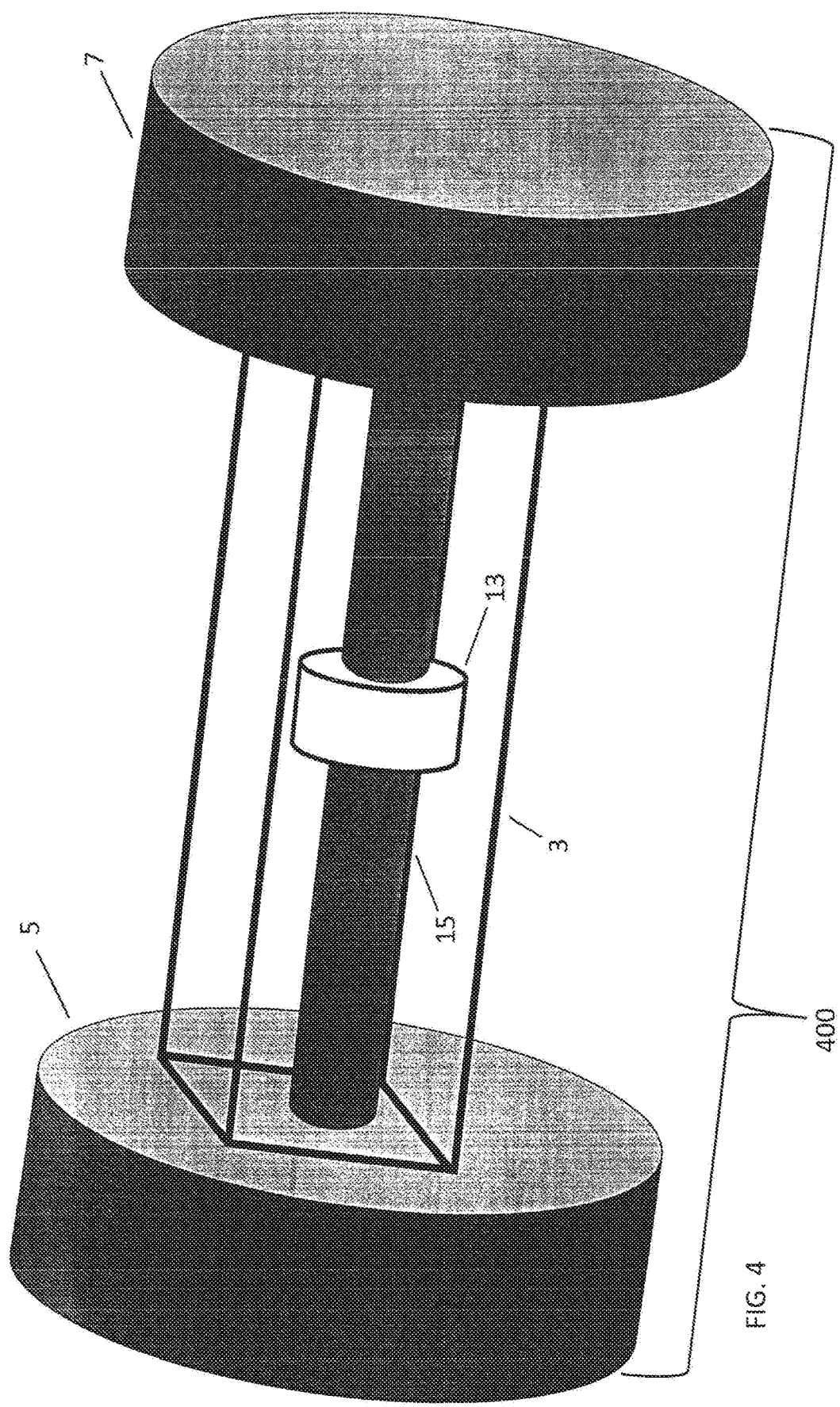
FIG. 4 shows an apparatus in a third motor configuration in accordance with aspects of the disclosure.

FIG. 4 shows a module 400 having a third motor configuration. In this exemplary third motor configuration, chassis 3 of module 400 can include a first axle 15 and a third chassis mounted electric motor (TCMEM) 13. TCMEM 13 is structured and arranged to be mounted within chassis 3 and mechanically connected to first axle 15 for driving first wheel 5 and/or second wheel 7. In this embodiment, first wheel 5 can be coupled for rotation on a first end of first axle 15 and second wheel 7 can be coupled for rotation on a second end of axle 15. Moreover, it is noted that rotation of axle 15, as well as rotation of wheels 5, 7 on respective ends of axle 15, can be independent of chassis 3. Preferably, chassis 3 does not rotate. It is to be noted that in FIG. 4, and subsequent figures, chassis 3 is illustrated "transparently" for the understanding of the reader and ease of explanation as to how elements within chassis 3 may operate.

TCMEM 13 is operable to drive first axle 15. As first axle 15 is rotatably driven, first axle 15 drives at least one of first and second wheels 5, 7 so as to move module 400 as first and second wheels 5, 7 rotate. In embodiments, first axle 15 can be connected to rotatably drive both first wheel 5 and second wheel 7 at a same rate.

Figure 5:
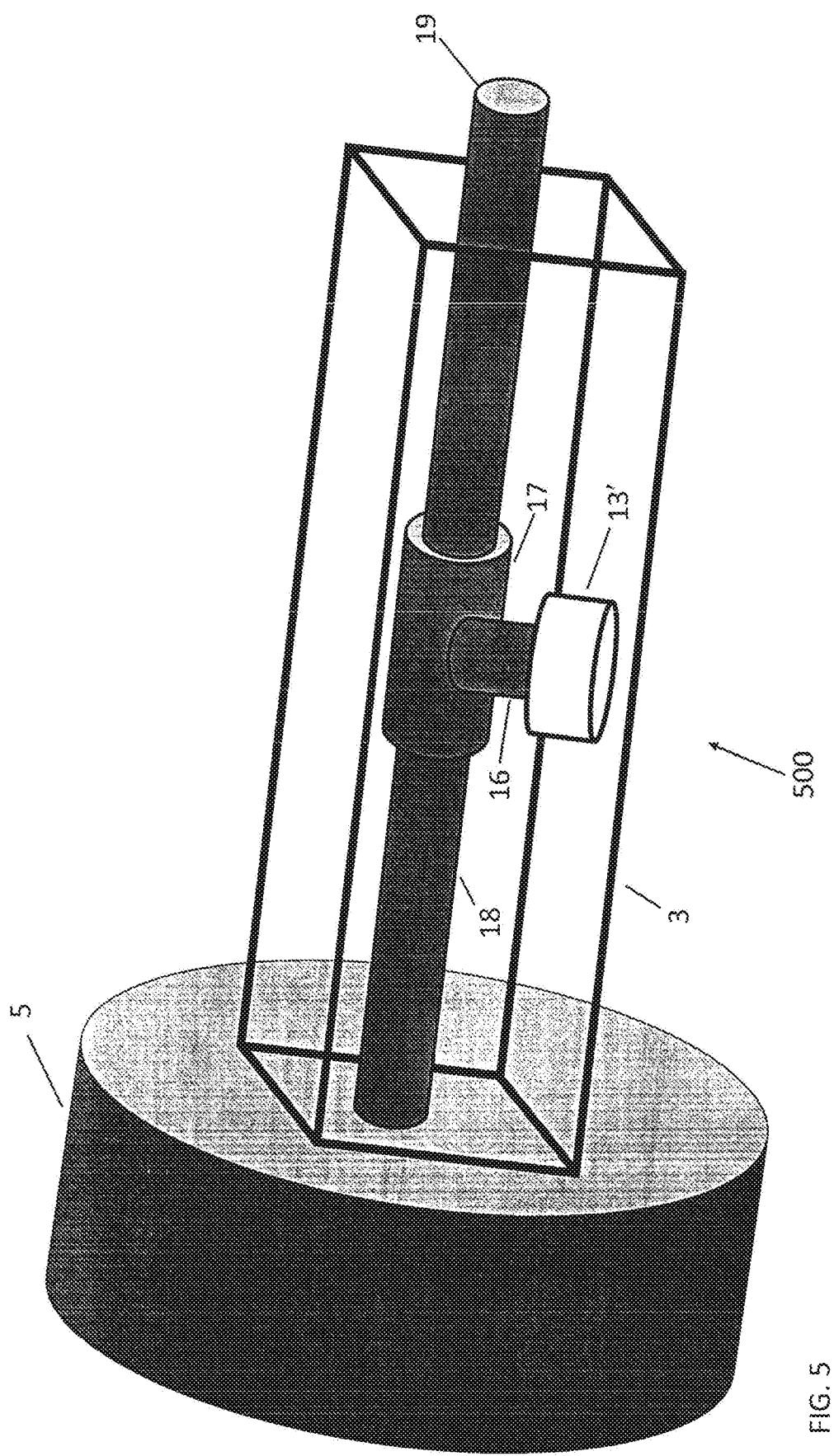
FIG. 5 shows an apparatus in a fourth motor configuration in accordance with aspects of the disclosure.

FIG. 5 shows a module 500 having a fourth motor configuration. In the fourth motor configuration, chassis 3 includes a second axle 18 coupled to first wheel 5 and a third axle 19 coupled to second wheel 7 (not shown). Ends of second axle 18 and third axle 19 can be coupled together by a first gear configuration (FGC) 17. Further, a first connection rod (FCR) 16 can be arranged to couple FGC 17 to a TCMEM 13' in order to transmit the rotational force from TCMEM 13' to FGC 17.

TCMEM 13' can impart a first rotational force to FCR 16, which is configured to impart this first rotational force into FGC 17. FGC 17 may then output or impart a second rotational force to second axle 18 and a third rotational force to third axle 19. Via the arrangement of structural elements in this exemplary fourth motor configuration, the first rotational force applied from TCMEM 13' to FGC 17 can be split into second and third rotational forces on second axle 18 and third axle 19, respectively, to allow first wheel 5 and second wheel 7 to rotate independently of each other.

In embodiments, FGC 17 can be, but is not necessarily, a limited-slip differential, and/or may include a planetary gear.

Figure 6:
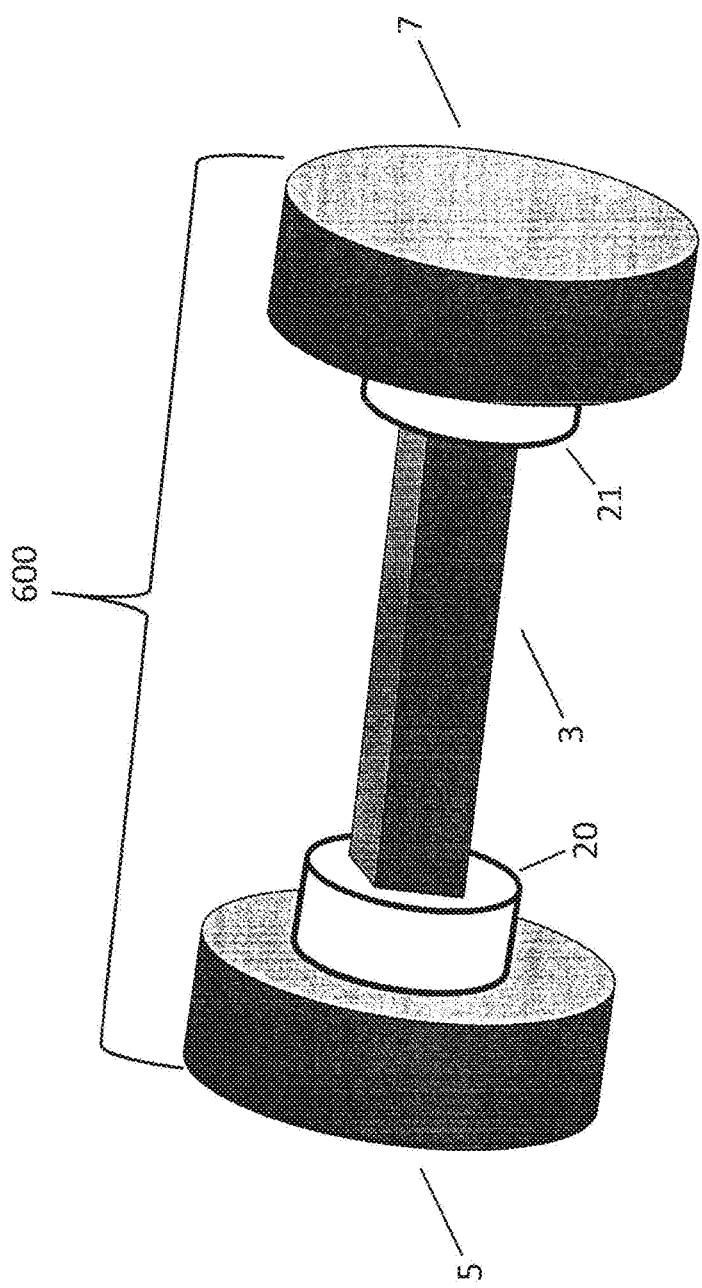
FIG. 6 shows an apparatus further comprising brakes in accordance with aspects of the disclosure.

FIG. 6 shows a module 600, in which a first brake 20 and a second brake 21 are attached to chassis 3. Any appropriate type of brake can be utilized, including, but not limited to, disc and drum brakes. First brake 20 can apply a first braking force to first wheel 5 and second brake 21 can apply a second braking force to second wheel 7. Further, first and second brakes 20, 21, which can be coupled to the control panel, as well as to the first and second plurality of instruments, may be driven and controlled independently from each other so that separate braking forces can be imparted to first wheel 5 and second wheel 7. In embodiments, brakes 20, 21 can be, but are not necessarily, disc brakes or drum brakes.

Figure 7:
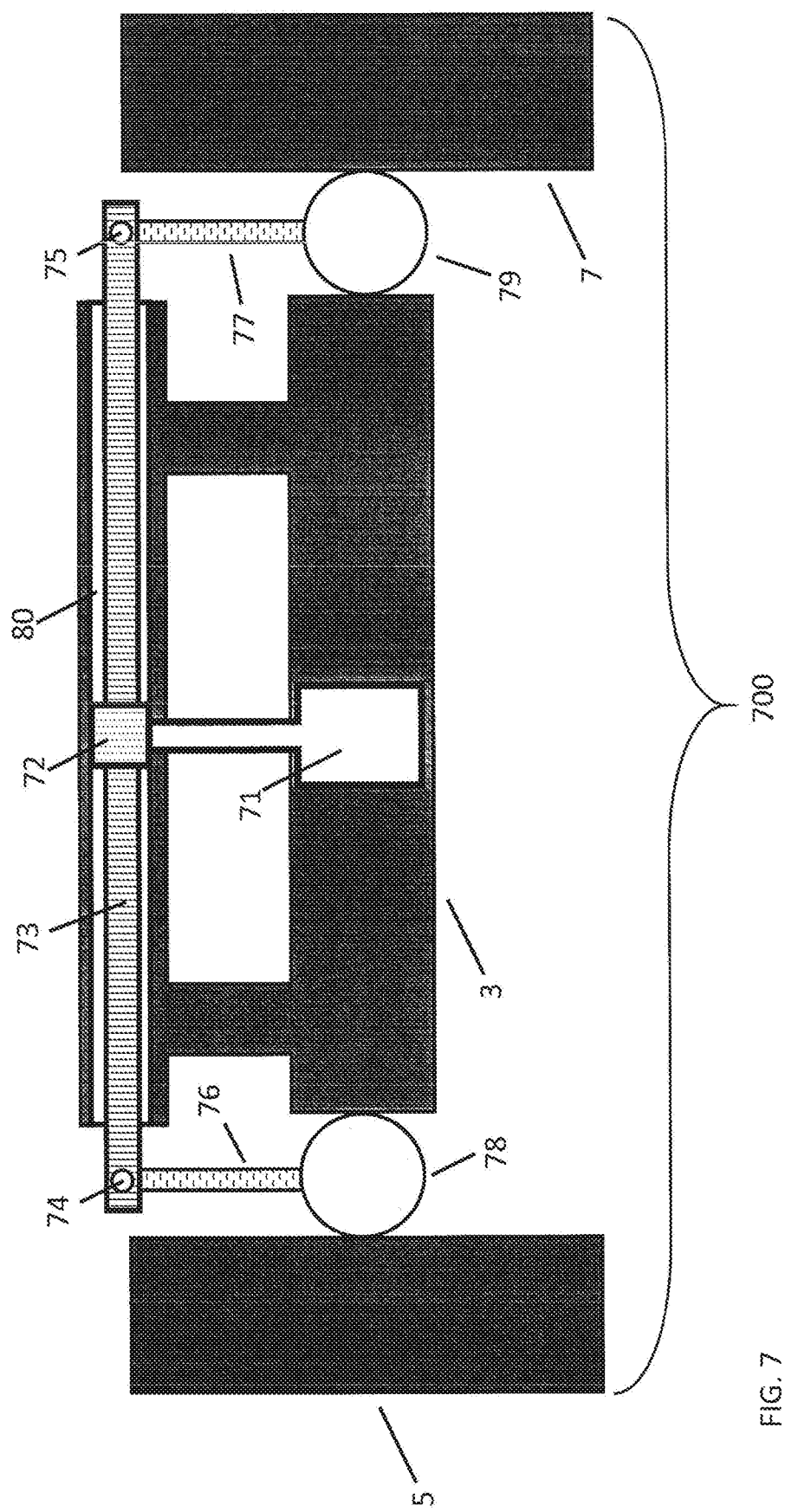
FIG. 7 shows an apparatus further comprising a steering system in accordance with aspects of the disclosure.

FIG. 7 shows a top view a module 700 to illustrate the manner in which module 700 is steerable. By way of non-limiting example, module 700 may include a rack and pinion steering system. In the illustrated embodiment, pinion driving electric motor (PDEM) 71, which can be coupled to chassis 3, is connected to a pinion 72 on a rack 73 within a rack track (RT) 80. A first steering arm (FSA) 76 pivotably couples a first wheel pivot (FWP) 78 to a first end of rack 73 via a first rack pivot (FRP) 74. A second steering arm (SSA) 77 pivotably couples a second wheel pivot (SWP) 79 to a second end of rack 73 via second rack pivot 75.

Pinion 72 can be fixed to a rotating arm of PDEM 71 and is in operational contact with rack 73 to drive rack 73. This driven movement of rack 73, which lies within the RT 80, can be limited to translation along a single axis, i.e., a longitudinal axis of RT 80.

In addition to FSA 76, FWP 78 can be attached to first wheel 5 and to chassis 3 and, in addition to SSA 77, SWP 79 can be attached to second wheel 7 and chassis 3. In particular, a fixed portion of FWP 78 can be connected to chassis 3 and a rotatable (or pivotable) portion of the FWP 78 can be attached to FSA 76 and first wheel 5. As FSA 76 moves, i.e., due to movement of rack 73, FWP 78 rotates the rotatable (or pivotable) portion of FWP 78 which subsequently turns first wheel 5. Similarly, a fixed portion of SWP 79 can be connected to chassis 3 and a rotatable (or pivotable) portion of the SWP 79 can be attached to SSA 77 and second wheel 7. As SSA 77 moves, i.e., due to movement of rack 73, SWP 79 rotates the rotatable (or pivotable) portion of the SWP 77 which subsequently turns the second wheel 7.

Figure 8:
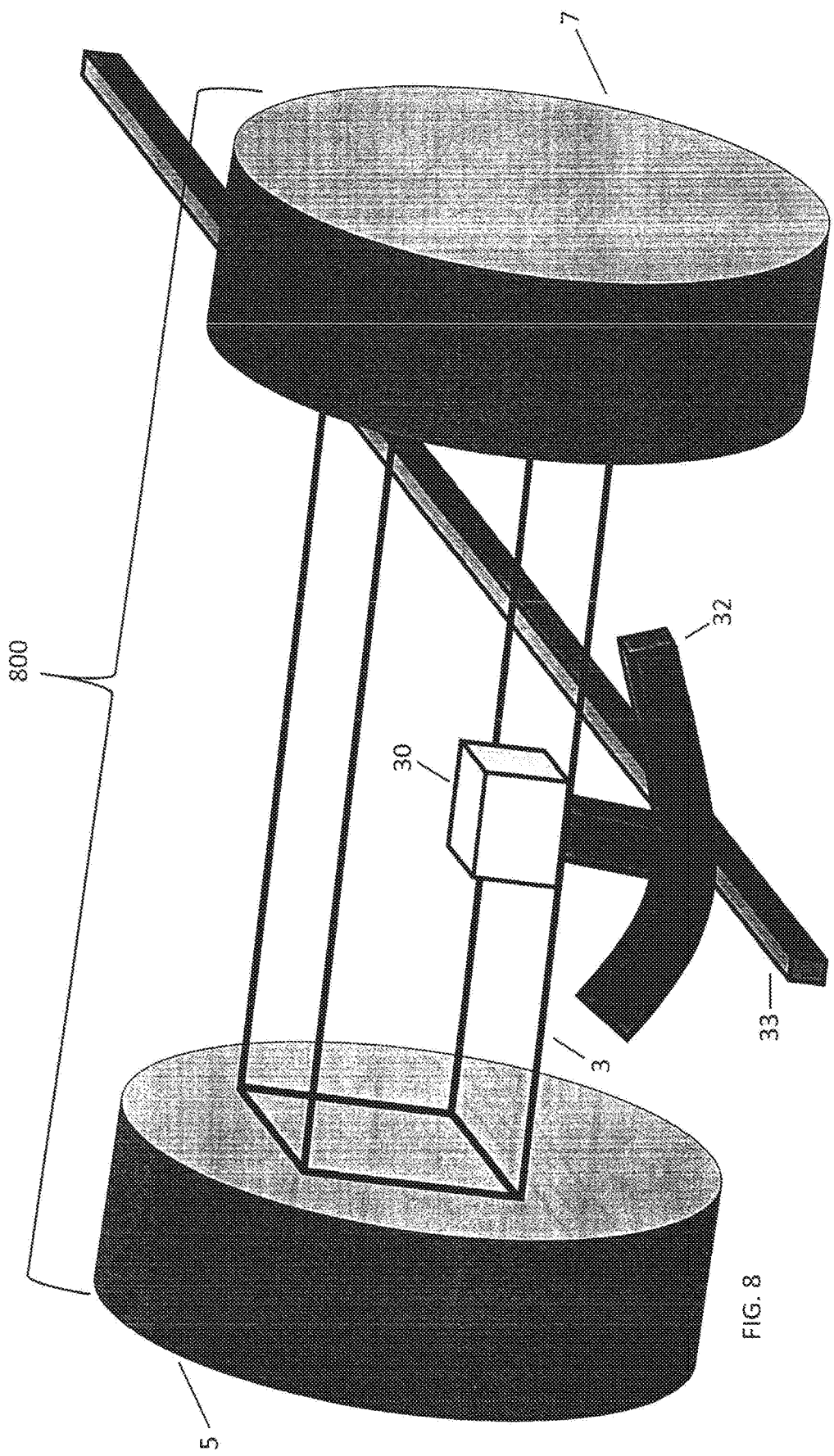
FIG. 8 shows an apparatus in a first power configuration in accordance with aspects of the disclosure.

FIG. 8 shows a module 800 in a first power configuration, in which chassis 3 can include a battery 30 and a pantograph 32. Battery 30 connects to and provides power to one or more electric motors (not shown) which are configured in module 800 according to one of the four above-discussed motor configurations. Battery 30 and pantograph 32 are fixed to chassis 3, while a first power supply line (FPSL) 33 can be arranged below module 800 for supply power, e.g., in the manner similar to a catenary overhead line. Pantograph 32, acting like a switch, can contact FPSL 33 to complete a circuit between FPSL 33 and battery 30. By laying FPSL 33 along a predetermined path that module 800 is intended to traverse, battery 30 of module 800 will have a connection to an external power supply while the module 800 is in motion. In other embodiments, first brake 20 and a second brake 21 depicted in FIG. 6 can be part of a regenerative braking system, whereby battery 30 can additionally or alternatively be charged during braking.

Figure 9:
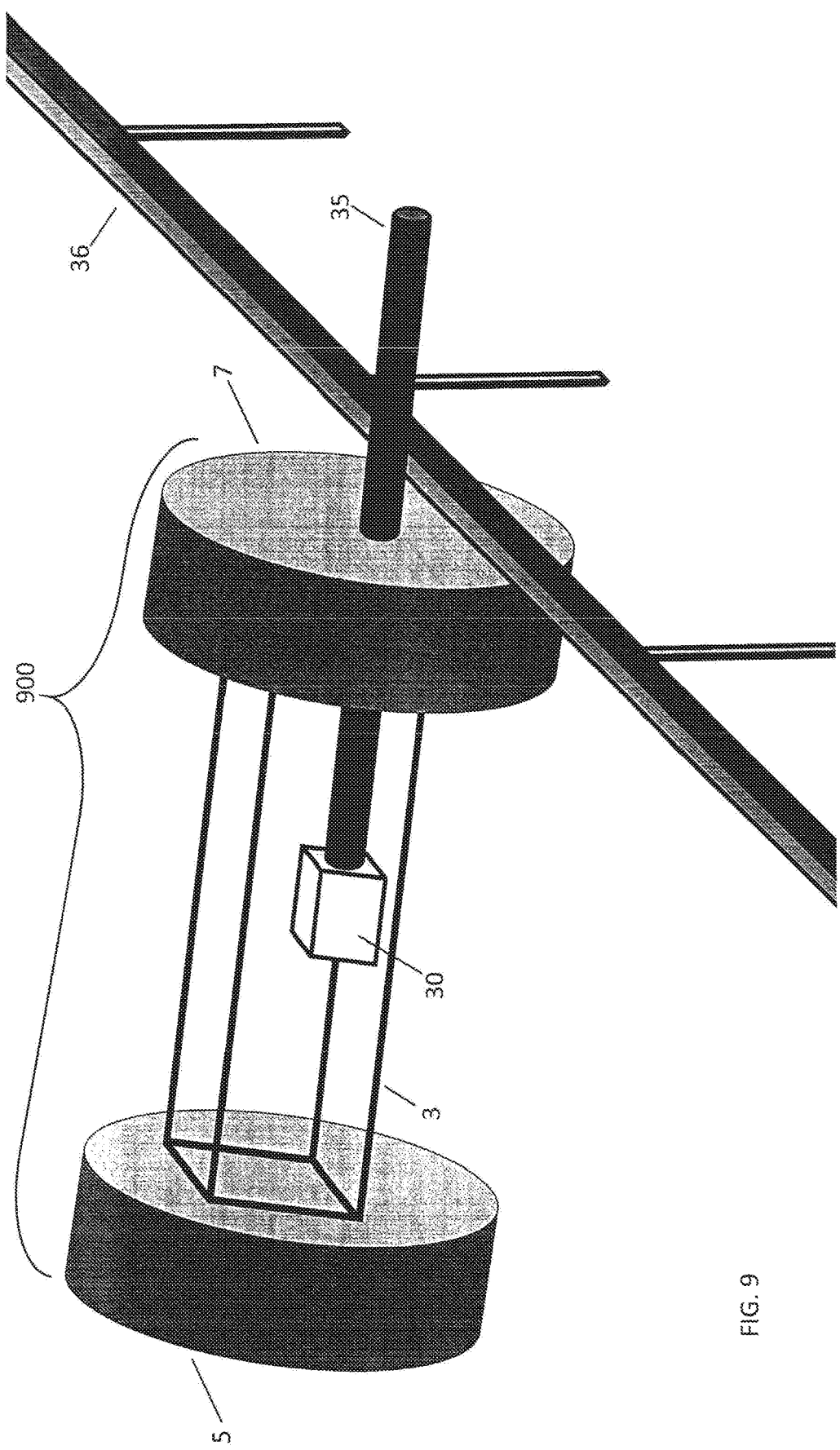
FIG. 9 shows an apparatus in a second power configuration in accordance with aspects of the disclosure.

FIG. 9 shows a module 900 in a second power configuration, in which chassis 3 can include battery 30 and an extended rail connector (ERC) 35. Again, battery 30 connects to and provides power to one or more electric motors (not shown) which are configured in module 900 according to one of the four above-discussed motor configurations. ERC 35 connects to a second power supply line (SPSL) 36, which can be arranged along an intended or predetermined traversal path of module 900. In this way, when the ERC 35 contacts the SPSL 36, a circuit between battery 30 and SPSL 36 is completed. By constructing and arranging SPSL 36 to generally parallel and/or closely follow the predetermined traversal path, battery 30 will have a connection to an external power supply while module 900 is in motion.

Figure 10:
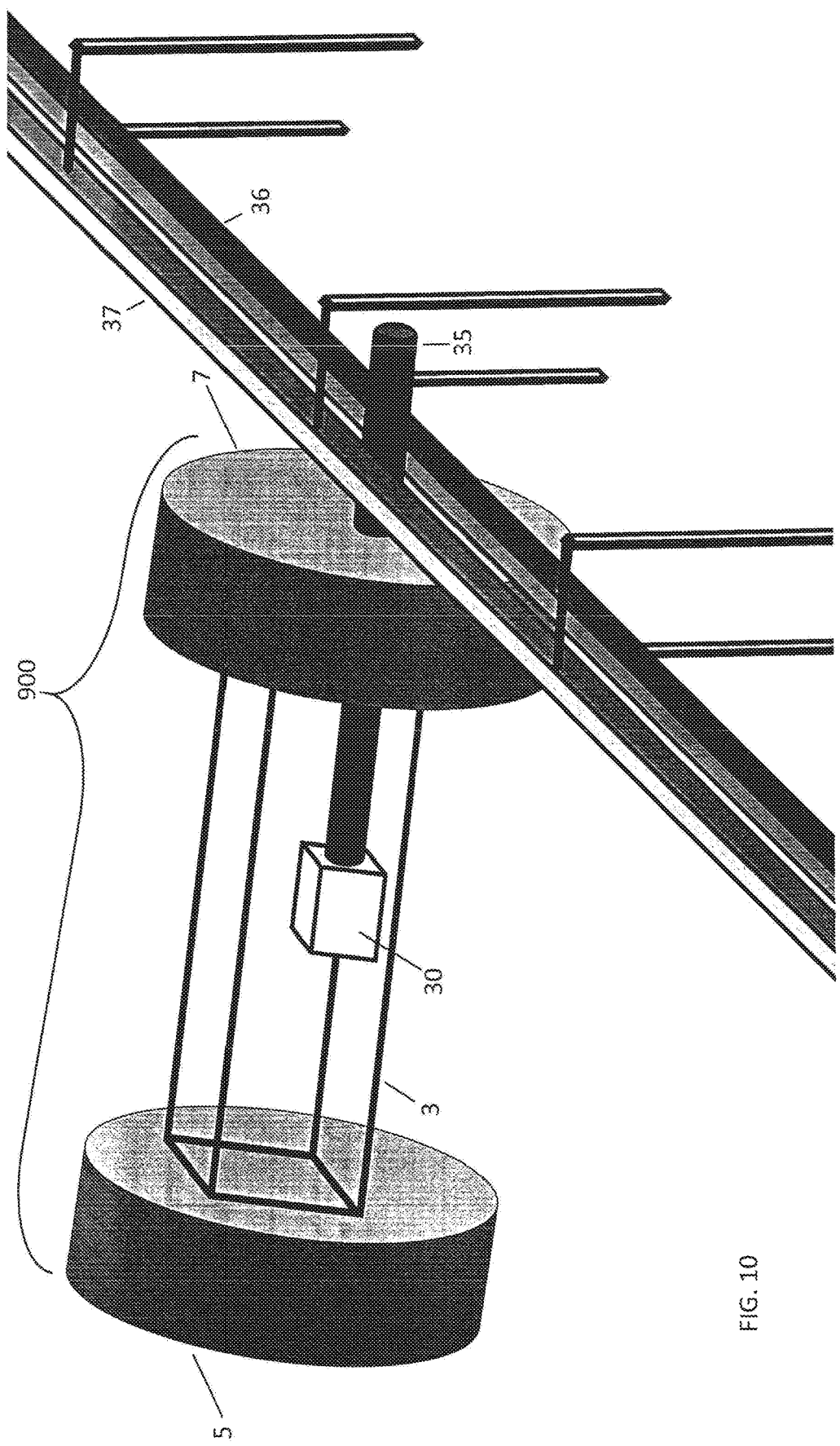
FIG. 10 shows an apparatus in the second power configuration further comprising an additional rail in accordance with aspects of the disclosure.

FIG. 10 shows module 900 having a second power configuration, which includes SPSL 36 and a guide rail 37. In embodiments, guide rail 37 can be structured and arranged so that ERC 35 cannot simultaneously contact SPSL 36 and guide rail 37. In further embodiments, guide rail 37 can be connected to an external power source so that guide rail 37 is configured as a redundant power supply for battery 30.

Figure 11:
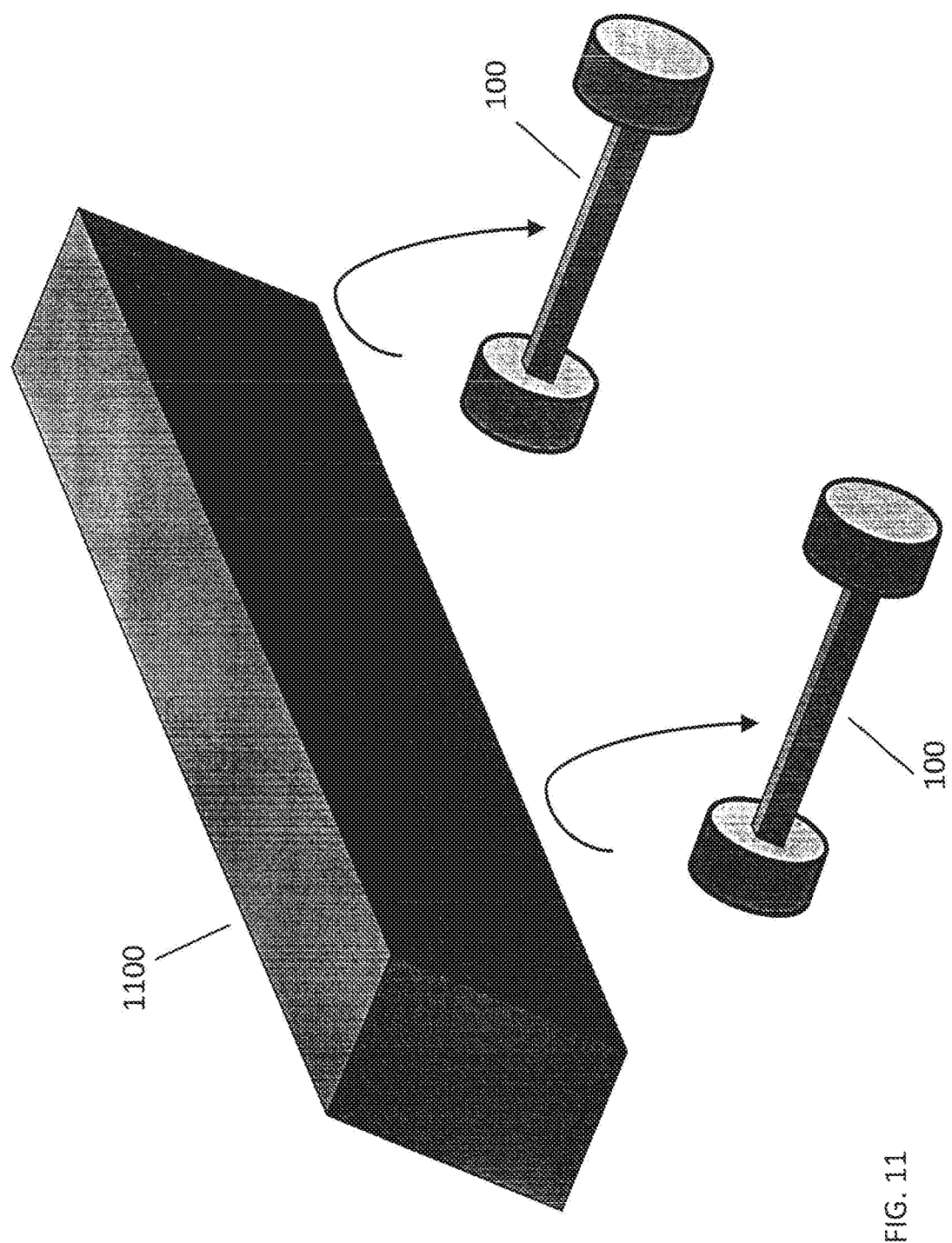
FIG. 11 shows how a payload may be loaded on first and second apparatus in accordance with aspects of the disclosure.

FIG. 11 shows a payload 1100, which can be attachable to at least one of the embodiments of the above-described modules, e.g., a first module 100 and a second module 100. While FIG. 11 shows payload 1100 being attachable to two similarly configured modules 100, it is to be understood that payload 1100 can likewise be attachable to dissimilarly configured modules without departing from the spirit and scope of the embodiments. Payload 1100 may be structured according to a number of optional configurations, e.g., a cargo container, a car chassis, a train car, a flat bed and/or any other desirable structure for conveying people and/or goods.

Figure 12:
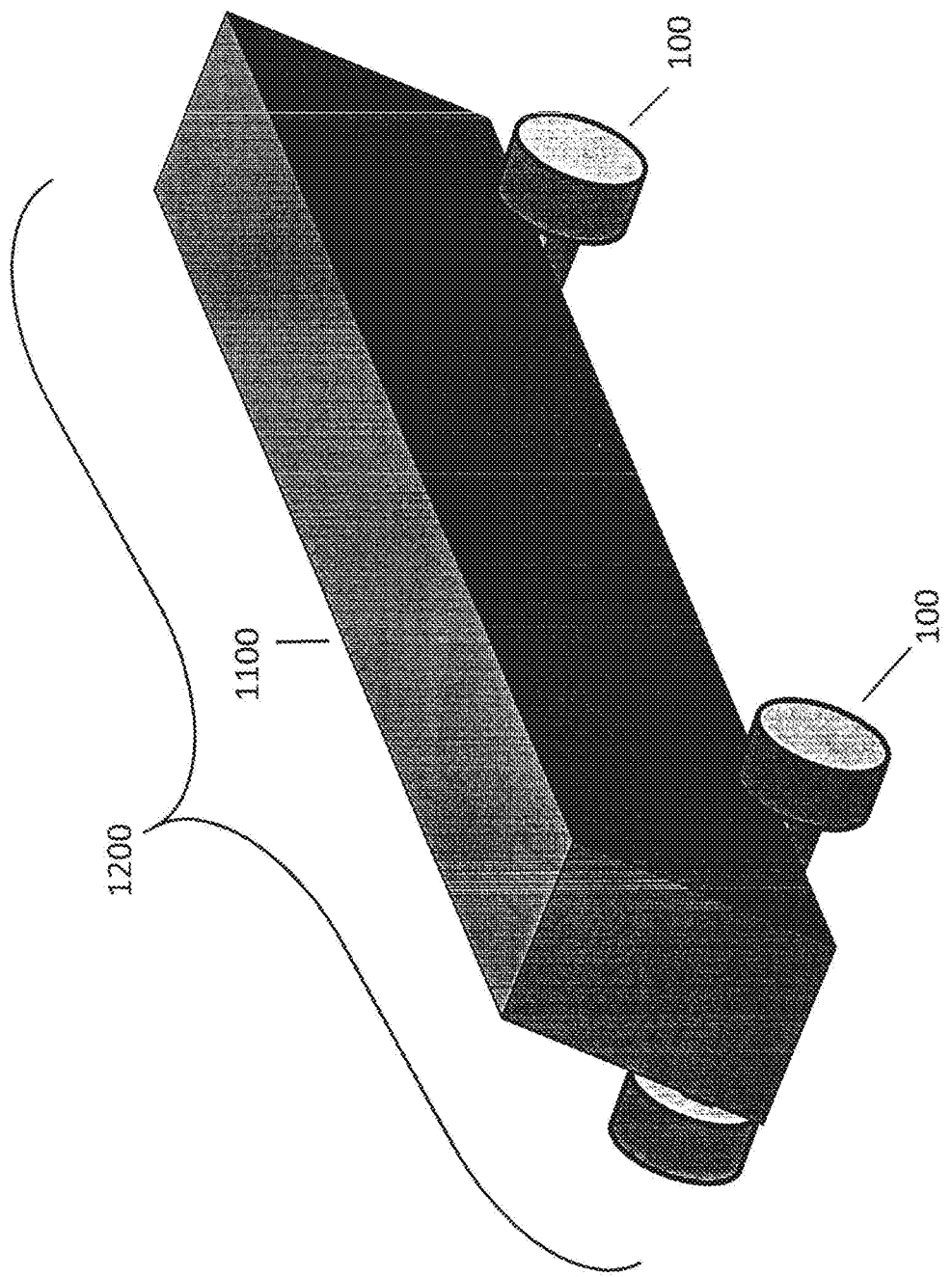
FIG. 12 shows the payload attached to the first and second apparatuses in accordance with aspects of the disclosure.

In FIG. 12, payload 1100 is attached to first and second modules 100. The combination of payload 1100 being attached to at least one modules can be understood to form an autonomous transport vehicle (ATV) 1200.

Figure 13:
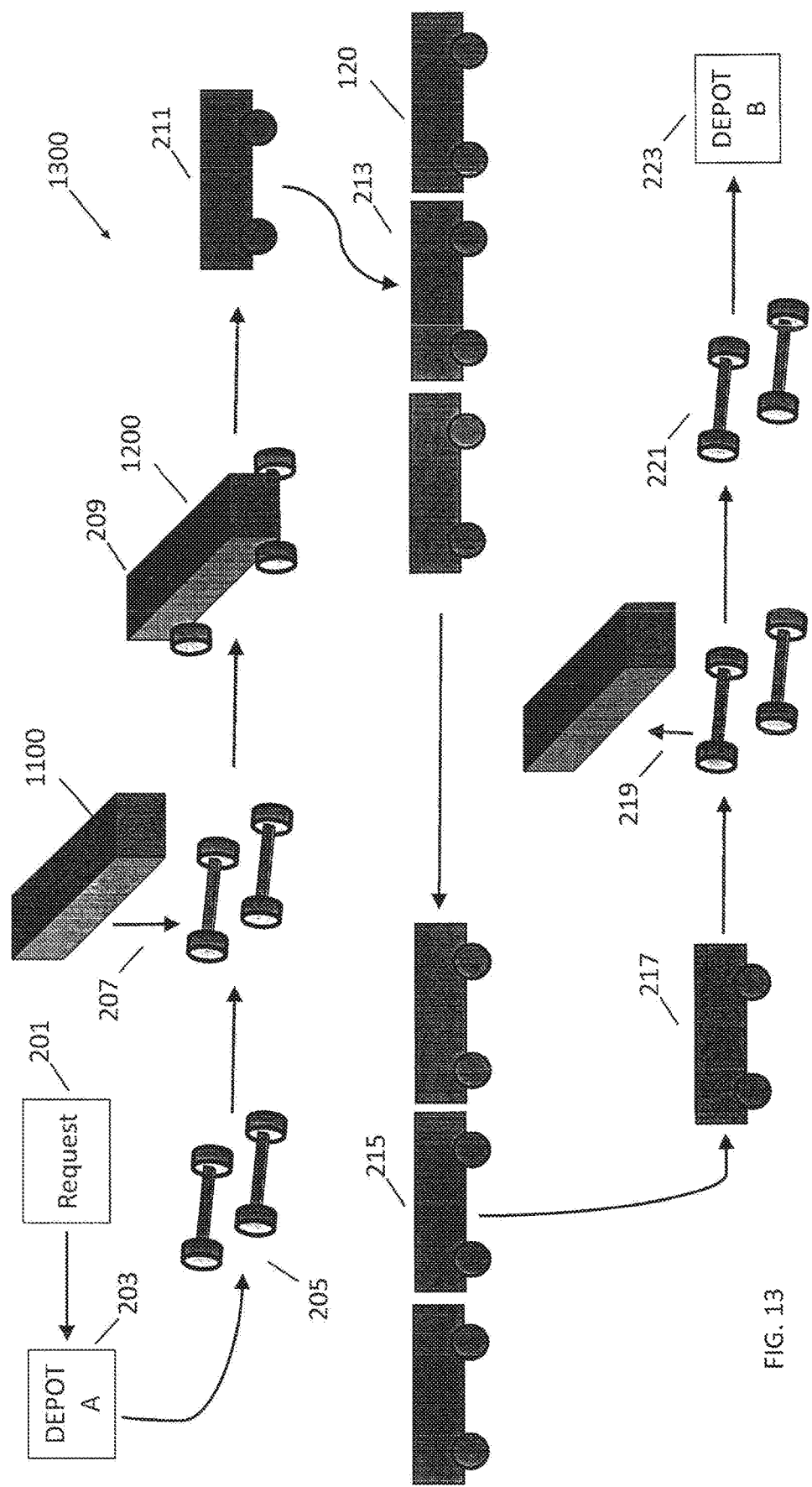
FIG. 13 shows an autonomous transportation system efficiently managing a plurality of autonomous transport apparatuses in accordance with aspects of the disclosure.

FIG. 13 shows an exemplary autonomous transport system (ATS) 1300, in which a plurality of stages are shown for the assembly, transport and disassembly of ATV 1200. At stage 201, ATS 1300 is initiated via a request for one or more modules. In embodiments, the request at stage 201 can originate from, e.g., a human or an autonomous request mechanism. At stage 203, the request is sent to a first storage depot (Depot A), where a plurality of modules is stored. Upon receiving the request, a number of unloaded modules corresponding to the requested number of modules, e.g., two modules, are instructed, at stage 205, to leave first storage depot and to move to a loading zone. At stage 207, the modules in the loading zone are positioned relative to each other at a spaced distance to accommodate payload 1100 to be loaded onto the modules, e.g., onto the chassis of the modules. Payload 1100 is loaded onto the modules at stage 209, whereby, e.g., an ATV 1200 (see FIG. 12) is formed. When lowered, payload 1100 can attach to the first and second modules 100. Alternatively, chassis 3 of the first and second modules can support the lowered payload 1100 during positioning. At stage 211, ATV 1200 leaves the loading zone under power from at least one, and preferably more than one, of the modules. ATV 1200 moves toward and merges into a convoy 120 at stage 213. Convoy 120 can transport the merged ATVs 1200 to a predetermined destination at stage 215. Further, ATVs 1200 remain together in convoy 120 between the loading zone and the predetermined destination. At stage 217, at least one of ATVs 1200 is disconnected from convoy 120 and moves to an unloading zone. At stage 219, payload 1100 is unloaded from the modules in the unloading zone. At stage 221, the unloaded modules are instructed to move to a second storage depot, Depot B, and, at stage 223, the modules in the second storage depot await further instructions, e.g., to move to another loading zone, move to a repair facility and/or to recharge batteries. It is noted that, in embodiments that include the power supply systems described in FIGS. 8, 9 and 10, it may not be necessary to recharge batteries. In alternative embodiments, the unloaded modules can be instructed to return to the first storage depot A to await further instructions.

Further, in embodiments, when the modules arrive at Depot B, the modules can perform diagnostic testing to determine whether repairs and/or charging is needed. Further, the modules can transmit the results of the diagnostic testing to a repair location and await instructions to proceed to a designed repair location or charging location.

Figure 14:
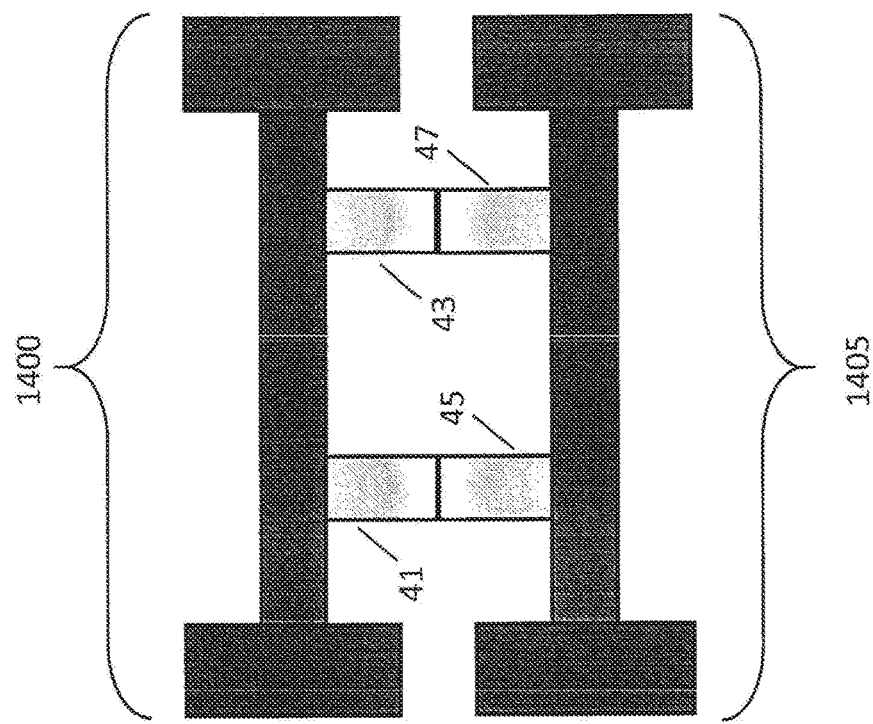
FIG. 14 shows how the first and second apparatuses can use electro-magnets to couple in accordance with aspects of the disclosure.
Figure 14:
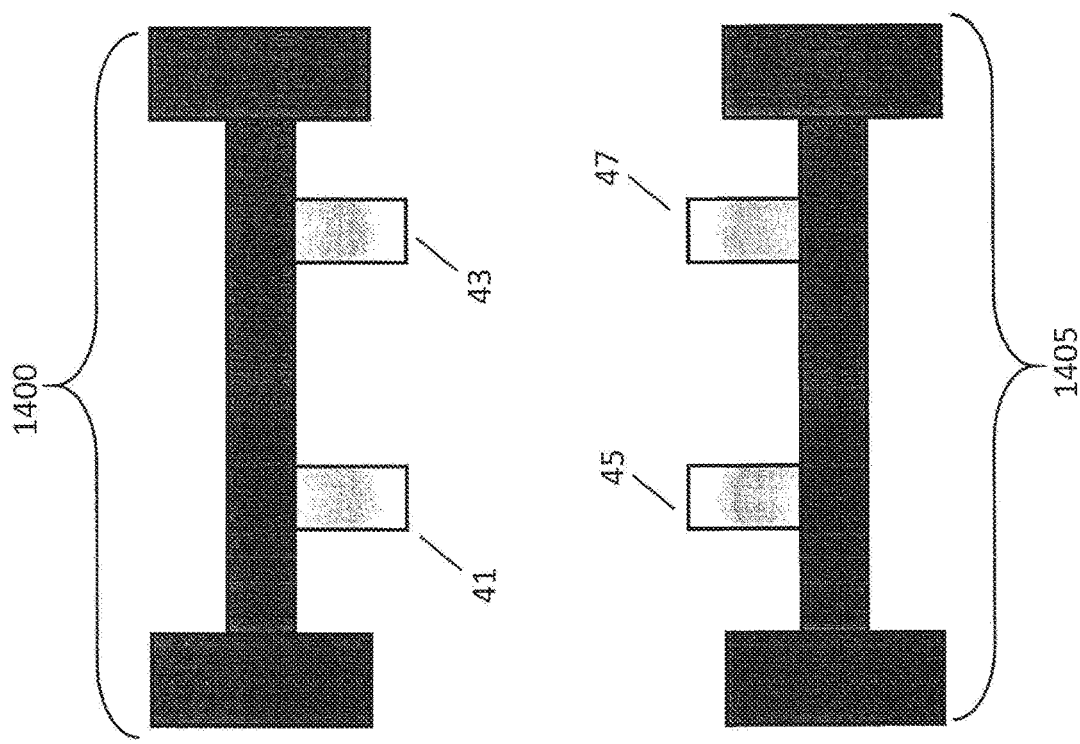

FIG. 14 shows a coupling arrangement that includes at least one, and preferably a plurality of electromagnets for coupling a first module 1400 and a second module 1405. First module 1400 may include first and second electromagnets 41, 43 and second module 1405 may include third and fourth electromagnets 45, 47. Further, it is noted that mechanical coupling concepts and/or permanent magnet concepts can be utilized with or as the coupling arrangement for coupling first module 1400 and second module 1405 without departing from the spirit and scope of the embodiments. Electromagnets 41, 43 can be coupled to the chassis of first module 1400 and spaced a predefined distance from each other that corresponds to a spacing of electromagnets 45, 47 coupled to second module 1405 so that, when coupling the first and second modules 1400, 1405, the electromagnets of the respective modules can be aligned with each other. In this regard, to begin the procedure for coupling the first and second modules 1400, 1405 together, the modules can be oriented so that electromagnets 41, 43 are arranged opposite electromagnets 45, 47, i.e., electromagnet 41 is positionable opposite electromagnet 45 and electromagnet 43 is positionable opposite electromagnet 47. Further, oppositely positioned electromagnets 41, 45 and 43, 47 are configured so that they attract each other, i.e., electromagnets 41, 45 attract each other, as do electromagnets 43, 47, to effect the coupling of the first and second modules 1400, 1405.

Once the modules are aligned, first module 1400 is moved relatively towards second module 1405 until the magnetic attraction completes the coupling process. That is, as first module 1400 nears second module 1405, the attraction between first and third electromagnets 41, 45 and the attraction between second and fourth electromagnets 43, 47 draw the oppositely arranged electromagnets together, which ultimately completes the electromagnetic coupling together of first and second modules 1400, 1405. To decouple the coupled first and second modules 1400, 1405, power can be removed from at least some of, and preferably, each of first, second, third, and fourth electromagnets 41, 43, 45, 47.

An operator can apply and remove the power to/from electromagnets 41, 43, 45 and 47 in order to perform the coupling and decoupling process. In this regard, the operator, who can be located at a central location or at a locality at which the first and second modules 1400, 1405 are currently located, can transmit coupling instructions to first and second modules 1400, 1405 to orient themselves relative to each other coupling and to move relatively toward each other. As the modules 1400, 1405 are moving toward each other, modules 1400, 1405 can be instructed to apply power to their respective electromagnets. Conversely, if modules 1400, 1405 are already connected, modules 1400, 1405 can be instructed to remove power from their respective electromagnets and move relatively away from each other to complete the decoupling procedure. Moreover, in an alternative procedure, rather than simply removing power from the electromagnets, the current applied to electromagnets 41, 43 of module 1400 can be reversed to repel electromagnets 45, 47 of module 1405, which would likewise achieve the desired decoupling.

It is further noted that coupling/decoupling instructions can be included with destination instructions transmitted to modules 1400, 1405 at depot A 203, see FIG. 13, so that ATV 1200 autonomously moves to join convoy 213 at a designated location and decouples from the convoy at 215 at the instructed destination.

Figure 15:
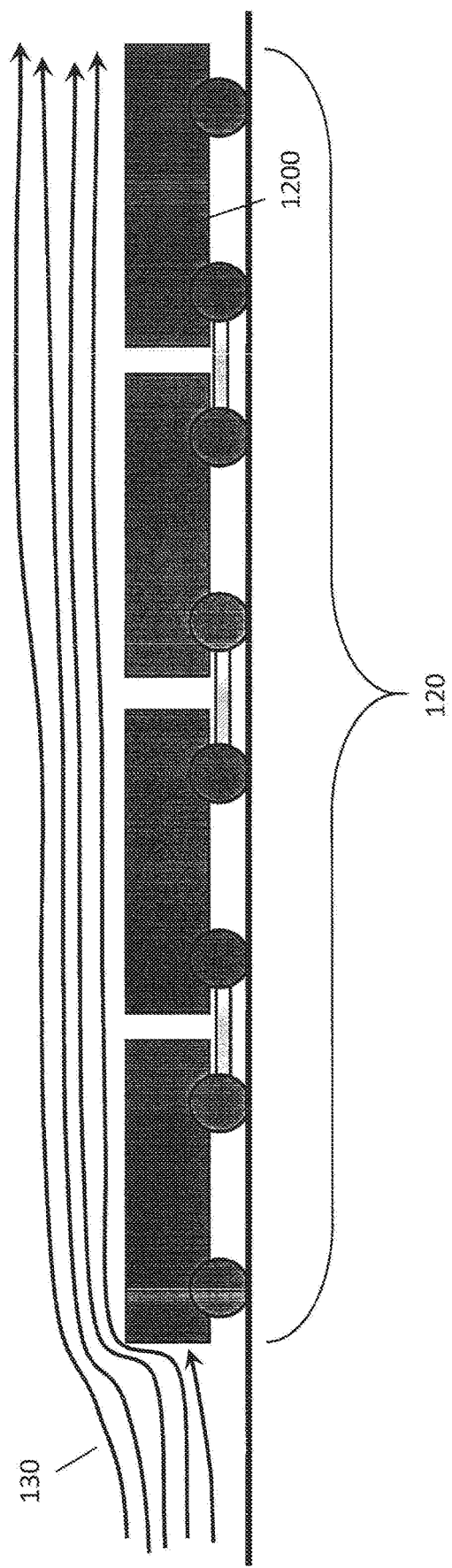
FIG. 15 shows how a plurality of ATVs may couple together to form a convoy in accordance with aspects of the disclosure.

In FIG. 15, a plurality of ATVs 1200 may be coupled together, e.g., electromagnetically, to form a convoy 120. FIG. 15 further shows how a first ATV 1200 in convoy 120, which is moving from right to left in the exemplary illustration, bears a majority of the drag force due to air 130 being displaced by the lead ATV.

As shown in FIG. 15, when convoy 120 is moving, it is subjected to a plurality of slowing forces including wheel-friction and air resistance. Drag forces due to air resistance is proportional to an object's velocity relative to a fluid through which the object is traveling. As the object's velocity increases, so must the energy expenditure to counter the increased drag force. For example, primary air drag force $F_D$ can be calculated from:

$$F_D = \tfrac{1}{2} * ro * v^2 * C_D * A,$$

where
ro=mass density of the fluid;
v=flow velocity;
$C_D$=drag coefficient; and
A=Cross-sectional surface area perpendicular to the flow.

However, when multiple objects group together, such as cars in a convoy, cyclists in a peloton, birds in a flying V, etc., the increase in drag-force is primarily applied to a lead object of the group. Remaining objects in the group are not subjected to the same increase in drag force that the lead object is subjected to. Therefore, less energy is required to keep the non-lead objects at higher velocities. Thus, convoying greatly decreases energy needed to transport people and/or goods.

Figure 16:
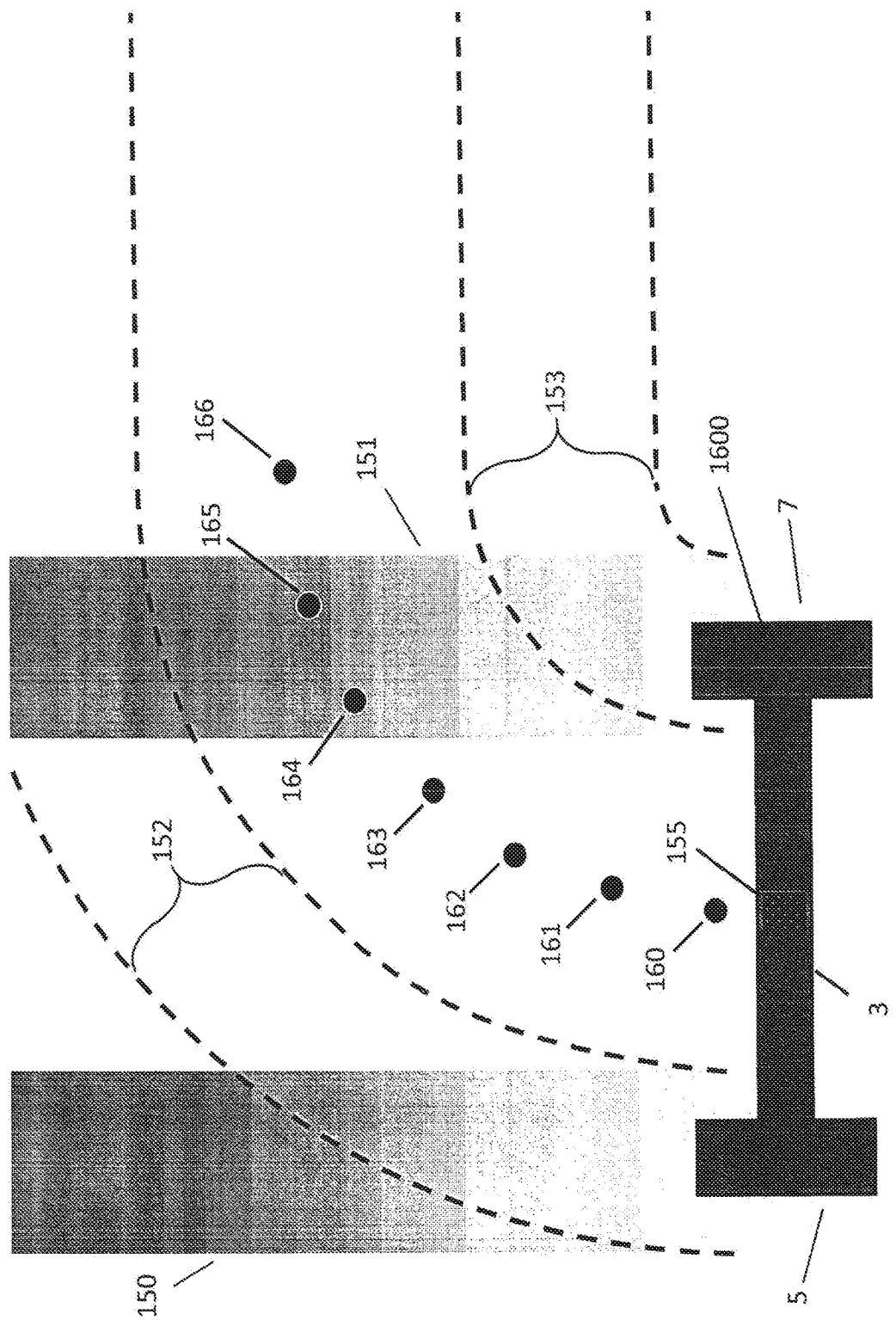
FIG. 16 shows a track selection apparatus using electro-magnets in accordance with aspects of the disclosure.

In FIG. 16, a module 1600, which includes a switching electromagnet (SEM) 155, is shown traveling along an exemplary track used to guide the module 1600. The track comprises a first wheel path 150, over which wheel 5 traverses, and a second wheel path 151, over which wheel 7 traverses. The track can also include a plurality magnetic elements that may be used to switch module 1600 onto another track. In embodiments, the plurality of magnetic elements can include electromagnets, permanent magnets or superconducting magnets.

The plurality of magnetic elements can include, at least, a first stationary magnetic element 160 and a last stationary magnetic element 166. The plurality of magnetic elements can additionally include second, third, fourth, fifth, and sixth magnet elements 161, 162, 163, 164, 165.

As module 1600, which is traveling from the bottom of the figure toward the top of the figure, nears first magnetic element 160, SEM 155 can be powered on, whereby a magnetic attraction arises between SEM 155 and approaching first magnetic element 160. Moreover, when first magnetic element 160 is an electromagnet, the electromagnet can also be powered on to further enhance the magnetic attraction. However, it is noted that in alternative embodiments, even when magnetic element 160 is an electromagnet, the electromagnet can remain in a powered on condition even after SEM 155 passes. As SEM 155 nears or arrives at first magnetic element 160, SEM 155 can be magnetically attracted by second magnetic element 161. Again, if the magnetic elements are electromagnets, the first electromagnet can be powered off as the second electromagnet 161 is powered on to achieve the magnetic attraction. However, it is noted that in alternative embodiments, even when magnetic element 160 is an electromagnet, the electromagnet can remain in a powered on condition even after SEM 155 passes. Moreover, when SEM 155 nears or arrives at second magnetic element 161, SEM 155 can be magnetically attracted by third magnetic element 162. Again, if the magnetic elements are electromagnets, the second electromagnet can be powered off as the third electromagnet is powered on to achieve the magnetic attraction or the electromagnets can remain in the powered on. This process repeats as SEM 155 nears and subsequently passes the third, fourth, fifth, sixth, and last magnetic elements 162, 163, 164, 165, 166.

Further, in embodiments, wheels 5, 7 can be in the form of a train wheel with an outer rubber covered portion, i.e., axially offset from the portion for riding on the train rail. In such an embodiment, as the SEM 155 is turned by the magnetic elements, a concrete or similar material platform can be formed at a level approximately to the height of a top of the rail head, whereby the rubber coated portion of wheels 5, 7 will begin to roll over the platform and lift the train wheel portion from the train rail. In particular, the platform can have, e.g., a mesa shape, so that a leading and trailing ramp can be formed on opposite sides of the platform in the train track direction, so that, as SEM 155 approaches the platform, the leading ramp will "rise" up until the train wheel is decoupled from the track and is riding on the rubber portion, and as SEM 155 is guided from the platform toward the tracks, SEM 155 is guided so that, when the rubber portion of the wheels reach the trailing ramp, the wheels will be lowered until the train wheel portion engages the train track.

Since SEM 155 is attached to chassis 3 of module 1600, first module 1600 follows a similar path to SEM 155. As SEM 155 passes last magnetic element 166, SEM 155 can be powered off. At this point, the module 1600 is now on an exemplary second track, which can include a third wheel path 152, over which wheel 5 traverses, and a fourth wheel path 153, over which wheel 7 traverses.

Figure 17:
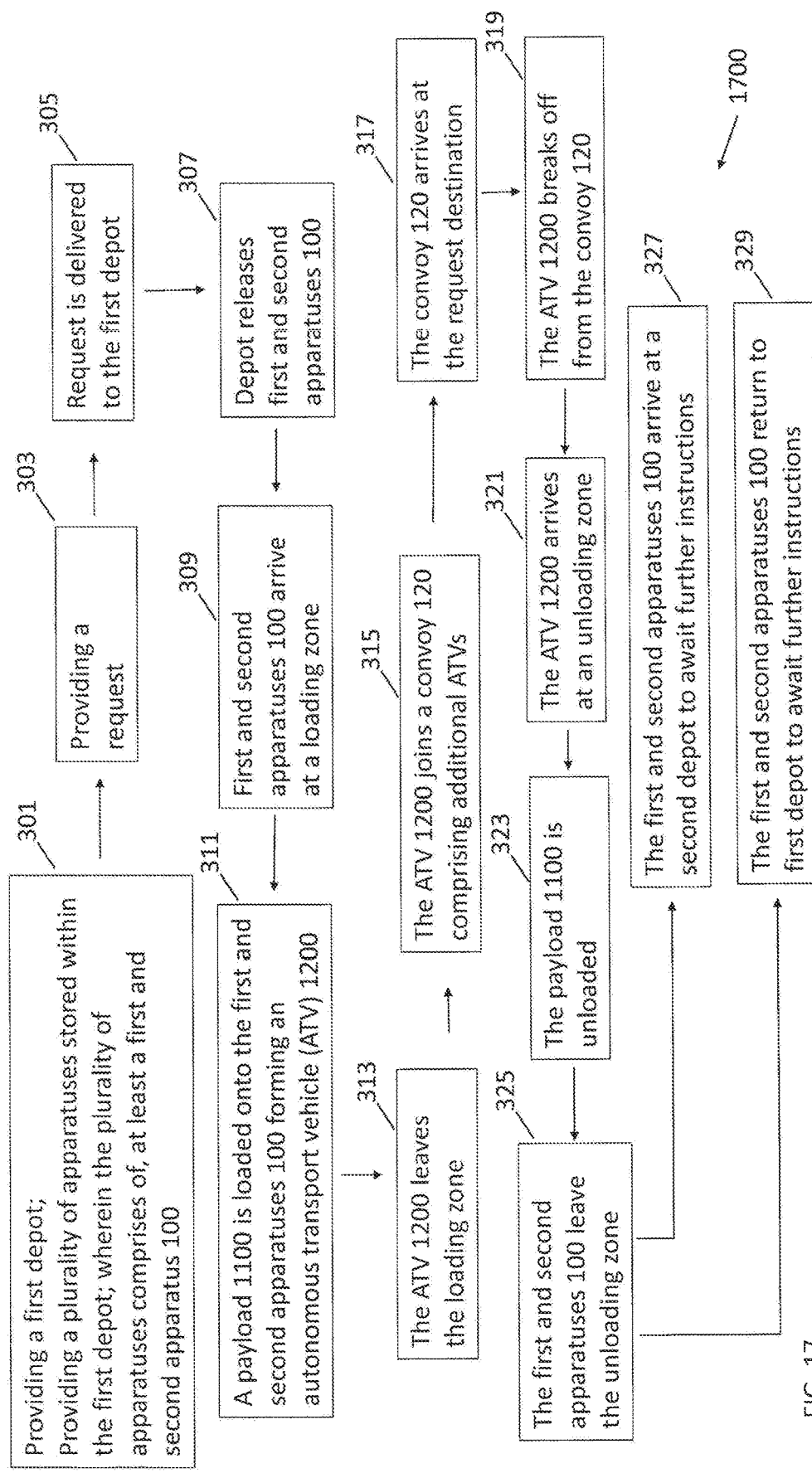
FIG. 17 shows a method for operating a system of autonomous transportation apparatuses in accordance with aspects of the disclosure.

FIG. 17 shows an exemplary and non-limiting method 1700 for operating an autonomous transportation system. Method 1700 includes, at 301, providing at a first depot, at least one and preferably a plurality of modules stored within the first depot. In the exemplary embodiment, at least first and second modules 100 are stored within the first depot. A request is initiated or provided, e.g., to a central controller or to a local controller, at step 303 for autonomous transport, e.g., for people and/or goods, and this request is delivered to the first depot at 305. Upon receiving the request, first and second modules 100 are released from or driven/transported, preferably autonomously, out of the first depot at 307. At 309, first and second modules 100 arrive at a loading zone. Once at the loading zone, first and second modules 100 are loaded at 311 with a payload 1100. Payload 1100 can be coupled to the first and second modules to form an autonomous transport vehicle (ATV) 1200. At 313, ATV 1200 leaves the loading zone, and subsequently, at 315, joins a convoy 120 that includes additional ATVs. Once convoy 120 arrives at the request destination, i.e., at 317, ATV 1200 breaks off from convoy 120, at 319, and is directed to an unloading zone, at 321. At 323, payload 1100 is unloaded from first and second modules 100, whereby only first and second modules 100 remain in the unloading zone. At 325, first and second modules 100 either receive instructions to move away from unloading zone 325 or are directed away from unloading zone 325. At this point, first and second modules 100 can drive to a second depot, at 327, to await further instruction or, alternatively, first and second modules 100 can be instructed or directed to return to the first depot to await further instructions.

System Environment

Aspects of embodiments of the present disclosure (e.g., control systems for the apparatus for autonomous transport systems) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device
a USB key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA), microcontrollers, etc.

Figure 18:
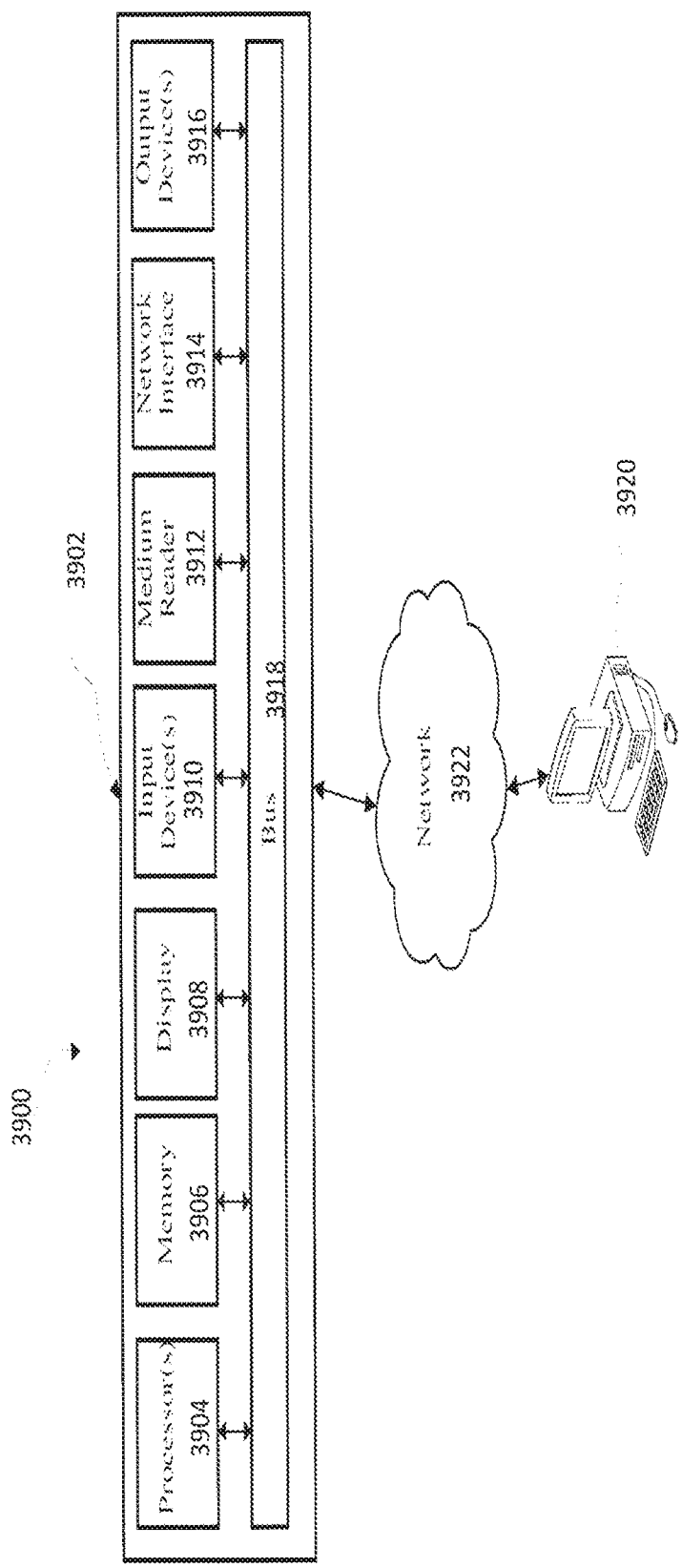
FIG. 18 is an exemplary system for use in accordance with the embodiments described herein.

FIG. 18 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 18, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 18, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 18. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present invention, those of ordinary skill can devise variations of the present invention without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed:

1. A method for autonomously transporting at least one of people or goods, comprising:
   requesting conveyance of a payload structured for conveying the at least one of people or goods from a designated area to a destination;
   autonomously moving at least two modules to the designated area, each of the at least two modules being configured for autonomous transport;
   loading the at least two modules with the payload within the designated area; and
   via at least one of the at least two modules, autonomously transporting the payload to the destination.

2. The method according to claim 1, wherein a plurality of modules are available and, based upon a size and shape of the payload to be conveyed, the at least one module comprises a determined specific number of the plurality of modules for supporting and autonomously transporting the payload.

3. The method according to claim 1, wherein a plurality of modules are available and the method further comprises instructing specific ones of the plurality of modules to autonomously move to the designated area for loading.

4. The method according to claim 3, wherein, when the specific ones of the plurality of modules is greater than one, the instructed specific ones of the plurality of modules position themselves in the designated area relative to each other to receive and balance the payload.

5. The method according to claim 1, wherein the payload loaded at least two modules travel in a convoy comprising a plurality of other payload loaded at least two modules.

6. The method according to claim 5, wherein at least one of the payload loaded at least two modules autonomously move the payload from the designated area to autonomously join the convoy.

7. The method according to claim 6, further comprising magnetically connecting at least one of the payload loaded at least two modules to at least one module of another payload loaded at least two modules of the convoy, wherein the convoy moves to the destination.

8. The method according to claim 7, wherein, when the convoy reaches the destination, the payload loaded at least two modules are decoupled from the convoy and autonomously moved to a designated unloading zone.

9. The method according to claim 1, wherein, when the destination is reached, the payload loaded at least two modules autonomously move to a designated unloading zone.

10. The method according to claim 9, further comprising unloading the payload from the at least two modules and autonomously moving the at least two modules to a second designated area.

11. The method according to claim 10, wherein, in the second designated area, the at least two modules await further instructions.

12. The method according to claim 1, wherein the payload comprises one of a container, a train car, a pod or a flatbed carrier.

13. The method according to claim 1, wherein at least one of the at least two modules comprises at least two wheels and a chassis arranged between the wheels.

14. The method according to claim 1, wherein at least one of the at least two modules comprises a magnetic levitation module.

15. The method according to claim 1, wherein at least one of the at least two modules comprises a battery and the method further comprises charging the battery while the at least one module is autonomously transporting the payload to the destination.

16. A system for autonomously transporting at least one of people or goods, comprising:
    a payload structured for carrying the at least one of people or goods; and
    at least two modules, which are each configured for autonomous transport movement and each have a chassis on which at least a part of the payload is supported,
    wherein the payload is removably connectable to the at least two modules.

17. The system according to claim 16, wherein each of the at least two modules comprises a steering system for guiding the autonomously moving each of the at least two modules.

18. The system according to claim 16, wherein at least one of the at least two modules comprises a rechargeable battery and a connection for charging the battery while the at least one module is autonomously moving.

19. The system according to claim 16, wherein each of the at least two modules comprises at least one magnetic coupling structured and arranged to releasably couple the at least two modules to one another.

20. A system for autonomously transporting at least one of people or goods, comprising:
    a payload structured for carrying the at least one of people or goods; and
    at least two modules, which are each configured for autonomous transport movement and structured to support at least a part of the payload,
    wherein the payload is removably connectable to the at least two modules, and
    wherein at least one of the at least two modules comprises two wheels and a chassis arranged between the two wheels.

* * * * *